United States Patent
Lin (10) Patent No.: US 10,589,403 B2
(45) Date of Patent: Mar. 17, 2020

(54) TOOL SOCKET

(71) Applicant: Sheng-Hsien Lin, Taichung (TW)

(72) Inventor: Sheng-Hsien Lin, Taichung (TW)

( * ) Notice: Subject to any disclaimer, the term of this patent is extended or adjusted under 35 U.S.C. 154(b) by 87 days.

(21) Appl. No.: 15/667,642

(22) Filed: Aug. 3, 2017

(65) Prior Publication Data
US 2019/0039226 A1    Feb. 7, 2019

(51) Int. Cl.
*B25B 13/10*    (2006.01)
*B25B 13/06*    (2006.01)

(52) U.S. Cl.
CPC ............ *B25B 13/105* (2013.01); *B25B 13/06* (2013.01)

(58) Field of Classification Search
CPC ...... B25B 13/105; B25B 17/088; B25B 13/06
See application file for complete search history.

(56) References Cited

U.S. PATENT DOCUMENTS

| | | | | |
|---|---|---|---|---|
| 5,622,090 A * | 4/1997 | Marks | .................. | B25B 13/105 269/266 |
| 5,806,385 A * | 9/1998 | Schupp | ................. | B25B 13/105 81/185 |
| 6,098,507 A * | 8/2000 | Lin | ........................ | B25B 13/105 81/185 |
| 6,138,534 A * | 10/2000 | Cho | ........................ | B25B 13/105 81/185 |
| 6,374,710 B2 * | 4/2002 | Kuo | ....................... | B25B 13/105 81/185 |
| 9,428,283 B2 * | 8/2016 | Hyatt | ...................... | B64F 1/227 |

* cited by examiner

*Primary Examiner* — Daniel J Colilla (57) ABSTRACT

A tool socket contains: a body and an elastic operation assembly accommodated in the body. The body includes an accommodation groove and a fitting orifice. The elastic operation assembly includes a locking seat having multiple apertures. The accommodation groove has a hexagonal wall, six toothed spaces, any two inverted isosceles-trapezoid projections on each of six sides of a hexagonally wall thereof, and an isosceles trapezoid space for separating said any two inverted isosceles-trapezoid projections. The locking seat is formed in a toothed hexagon shape and has six toothed bulges corresponding to the six toothed spaces of the body individually, any two inverted isosceles-trapezoid recesses on each of six sides thereof, and an isosceles trapezoid projection configured to separate said any two inverted isosceles-trapezoid recesses. Said any two inverted isosceles-trapezoid recesses correspond to said any inverted isosceles-trapezoid projections separately, and the isosceles trapezoid projection corresponds to the isosceles trapezoid space.

3 Claims, 8 Drawing Sheets

Prior Art

F I G. 1

Prior Art

FIG.2

Prior Art

FIG.3

Prior Art

TOOL SOCKET

FIELD OF THE INVENTION

The present invention relates to a tool socket which has high torque and using durability as rotating a tool (such as a fastener).

BACKGROUND OF THE INVENTION

Referring to FIGS. 1-4, a conventional tool socket contains a body 10 in which an accommodation groove 11 is defined, wherein the accommodation groove 11 is hexagonal so as to house a hexagonal operation assembly 12. The hexagonal operation assembly 12 has a locking seat 13 on which multiple apertures 14 are arranged in a honeycomb shape so as to accommodate multiple elastic hexagonal columns 15 separately. In operation, the body 10 is fitted onto a tool (such as a fastener not shown), a part of the multiple elastic hexagonal columns 15 retract inwardly so that the other elastic hexagonal columns 15 retain and rotate the tool. However, the body 10 is broken easily, because a hexagonal wall of the locking seat 13 retains with the accommodation groove 11 at high torque after a period of using time.

The present invention has arisen to mitigate and/or obviate the afore-described disadvantages.

SUMMARY OF THE INVENTION

The primary objective of the present invention is to provide a tool socket which has high torque and using durability as rotating a tool (such as a fastener).

To obtain above-mentioned objective, a tool socket provided by the present invention contains: a body and an elastic operation assembly.

The body includes an accommodation groove defined in a lower end of the body, a fitting orifice formed in an upper end of the body and communicating with the accommodation groove.

The elastic operation assembly is accommodated in the body, and the elastic operation assembly includes a locking seat on which multiple apertures are arranged in a honeycomb shape so as to accommodate multiple elastic hexagonal columns individually.

The accommodation groove has a hexagonal wall arranged therein, six toothed spaces respectively extend outward from six corners of the hexagonally wall of the accommodation groove, and any two inverted isosceles-trapezoid projections extend outward from each of six sides of the hexagonally wall of the accommodation groove and are separated by an isosceles trapezoid space which extends outward from each side of the hexagonally wall of the accommodation groove.

The locking seat is formed in a toothed hexagon shape and has six toothed bulges respectively extending outward from six corners thereof and corresponding to the six toothed spaces of the accommodation groove of the body, and any two inverted isosceles-trapezoid recesses defined on each of six sides of the locking seat and are separated by an isosceles trapezoid projection which extends outwardly from each side of the locking seat.

Said any two inverted isosceles-trapezoid recesses correspond to said any inverted isosceles-trapezoid projections separately, and the isosceles trapezoid projection corresponds to the isosceles trapezoid space.

Preferably, a height of each of the six toothed spaces, said any two inverted isosceles-trapezoid projections, and the isosceles trapezoid space is equal.

Preferably, a height of each of the six toothed bulges, said any two inverted isosceles-trapezoid recesses, and the isosceles trapezoid projection is equal.

DETAILED DESCRIPTION OF THE PREFERRED EMBODIMENTS

Figure 1:
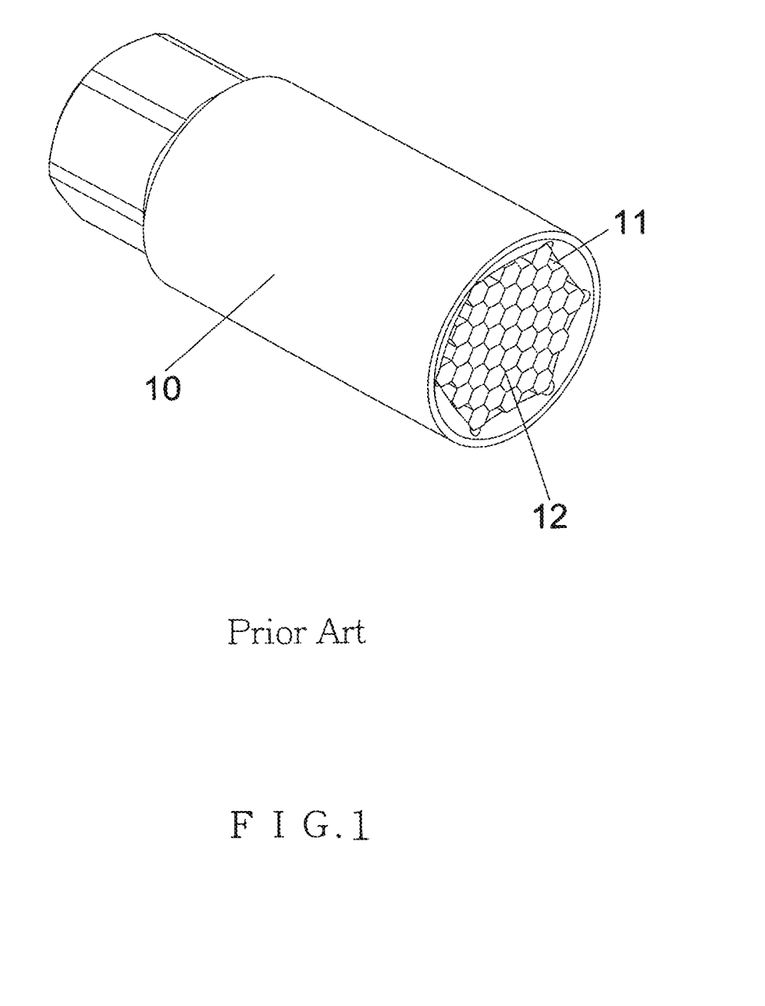
FIG. 1 is a perspective view showing the assembly of a conventional tool socket.
Figure 2:
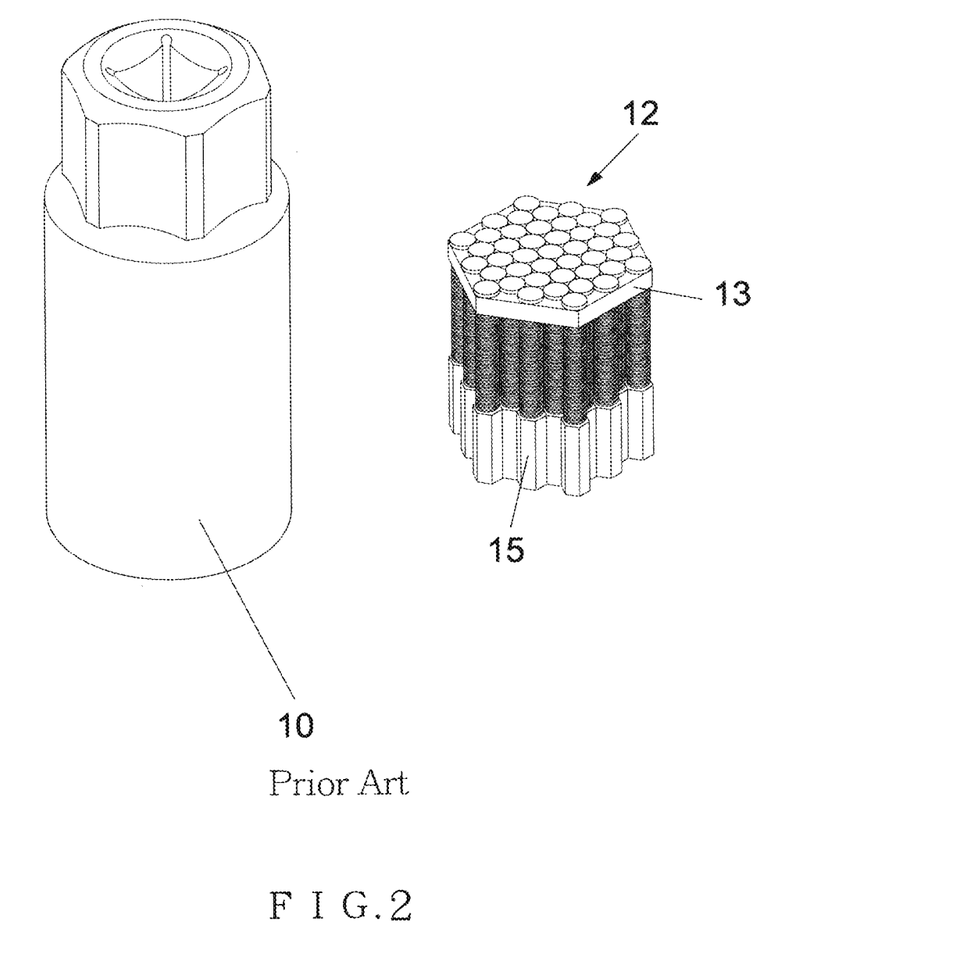
FIG. 2 is a perspective view showing the exploded components of the conventional tool socket.
Figure 3:
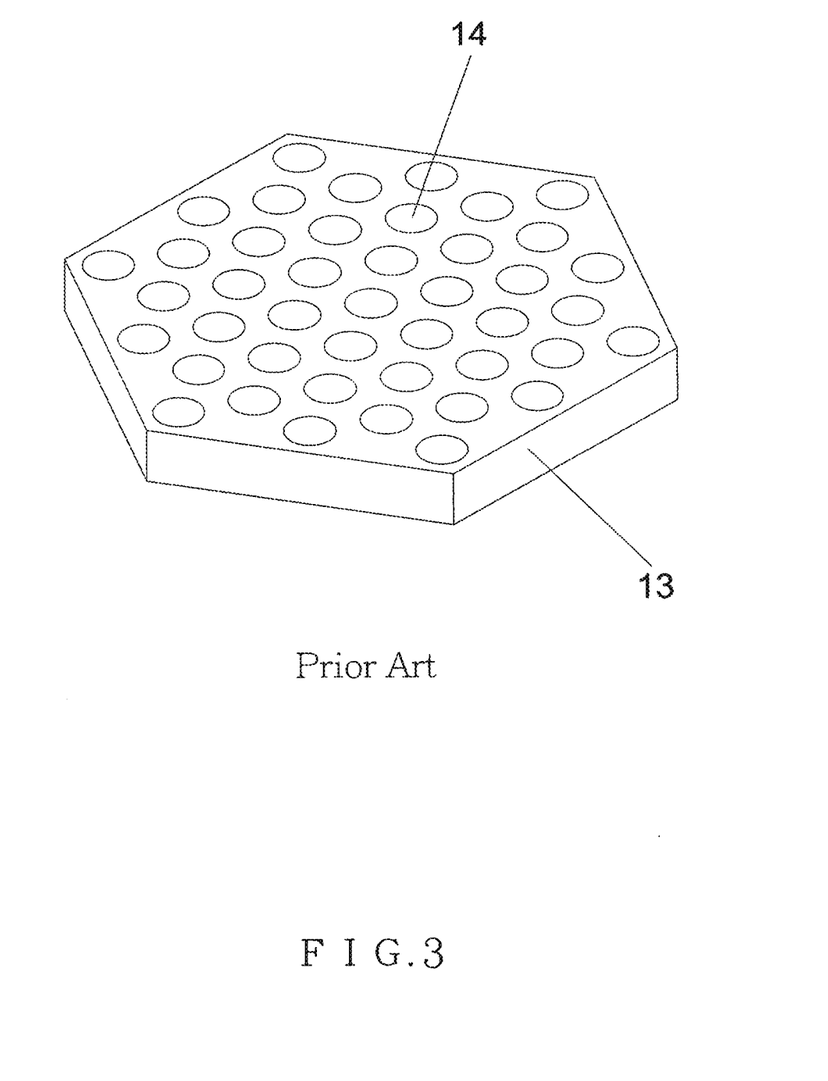
FIG. 3 is a perspective view of a part of the conventional tool socket.
Figure 4:
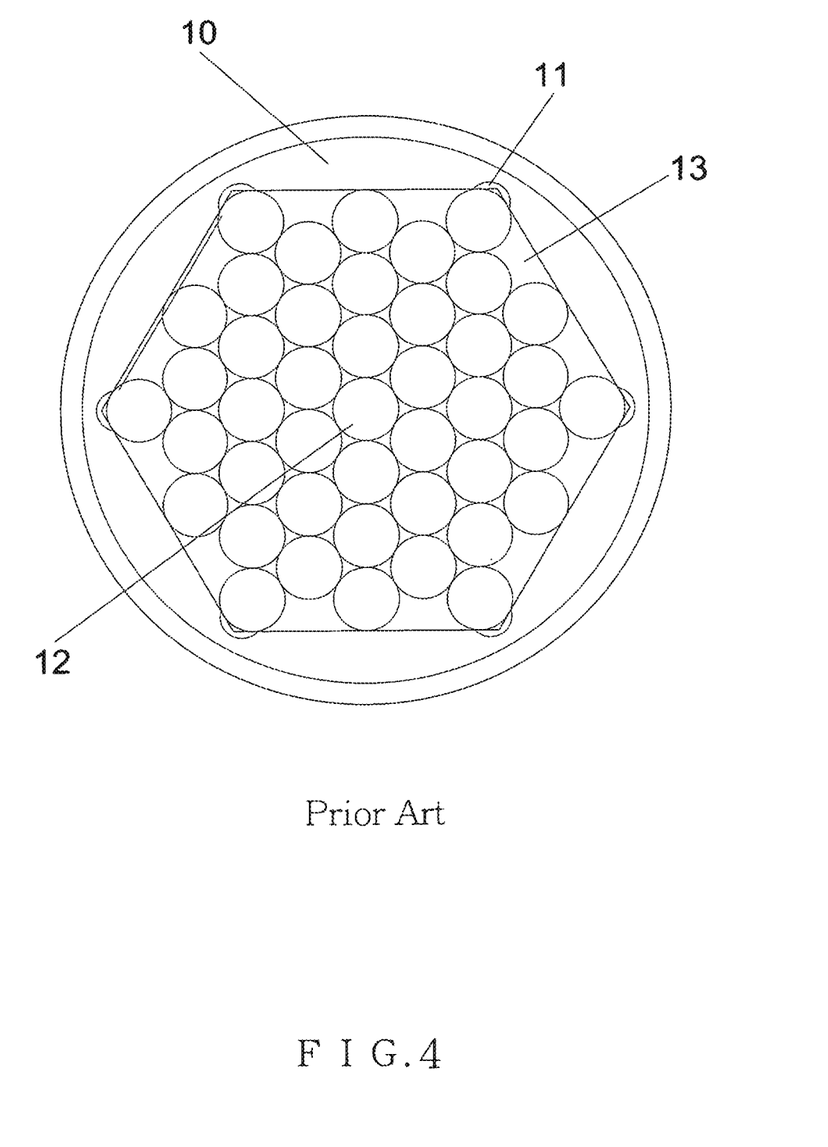
FIG. 4 is a side plan view showing the operation of the conventional tool socket.
Figure 5:
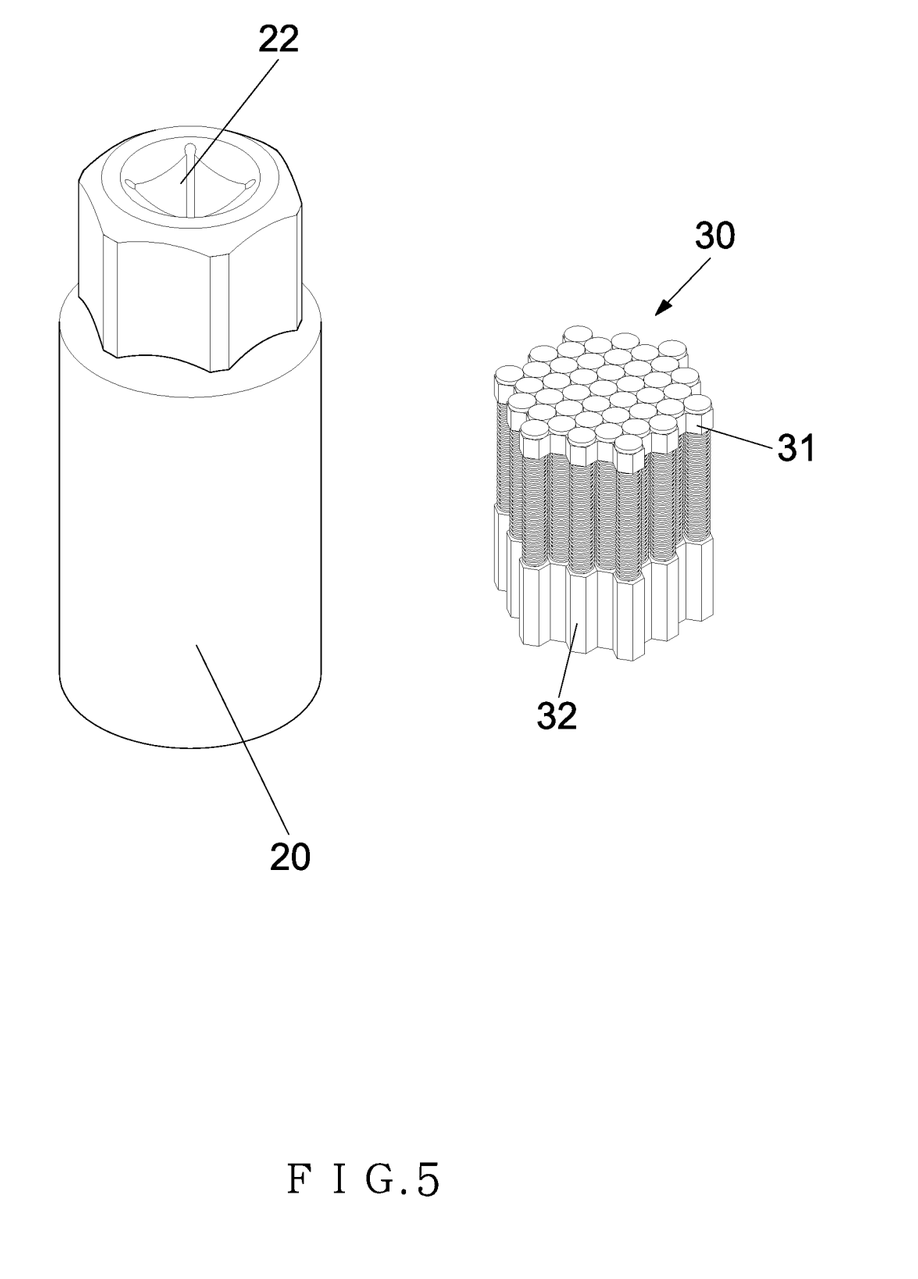
FIG. 5 is a perspective view showing the exploded components of a tool socket according to a preferred embodiment of the present invention.
Figure 6:
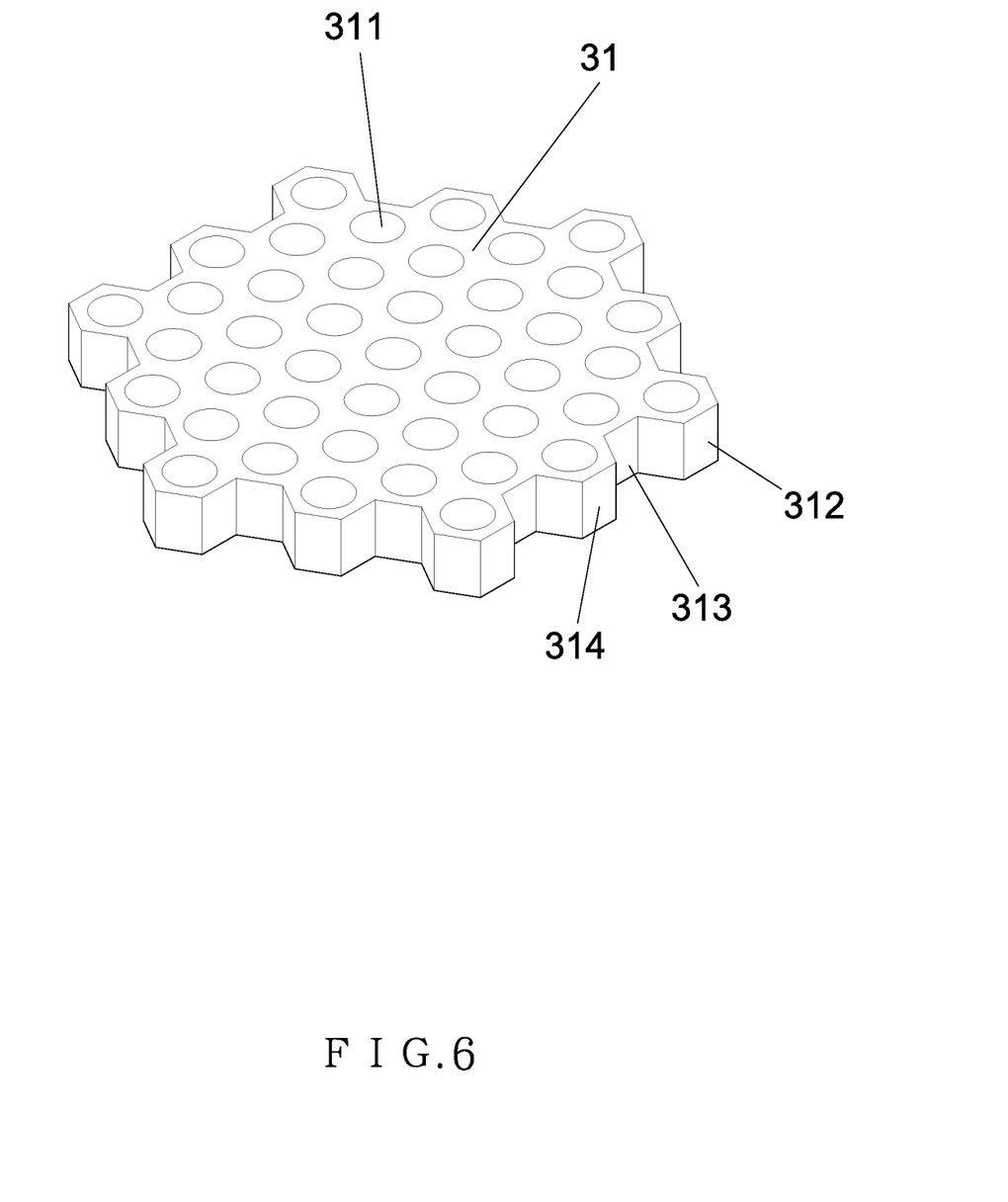
FIG. 6 is a perspective view showing the assembly of a part of the tool socket according to the preferred embodiment of the present invention.
Figure 7:
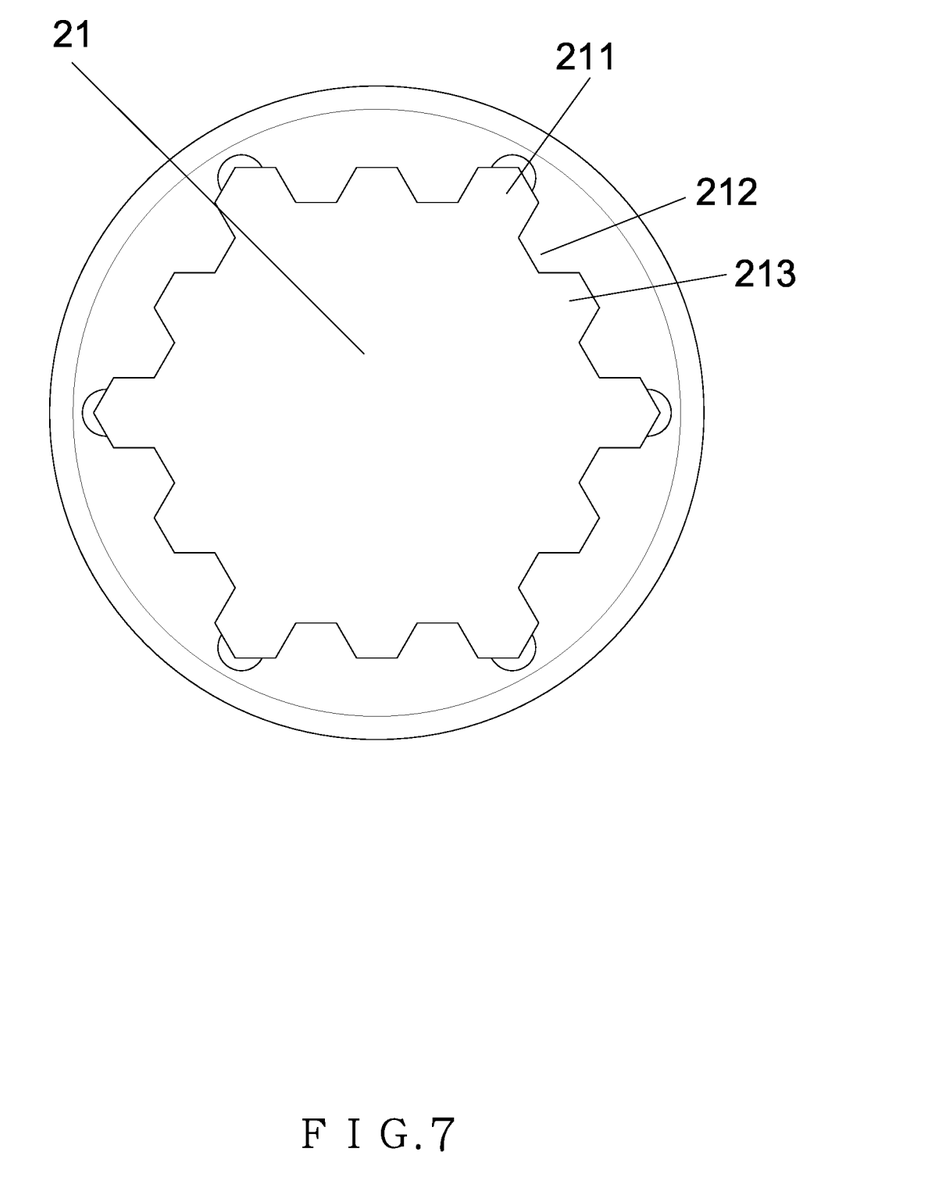
FIG. 7 is a side plan view showing the assembly of a part of the tool socket according to the preferred embodiment of the present invention.
Figure 8:
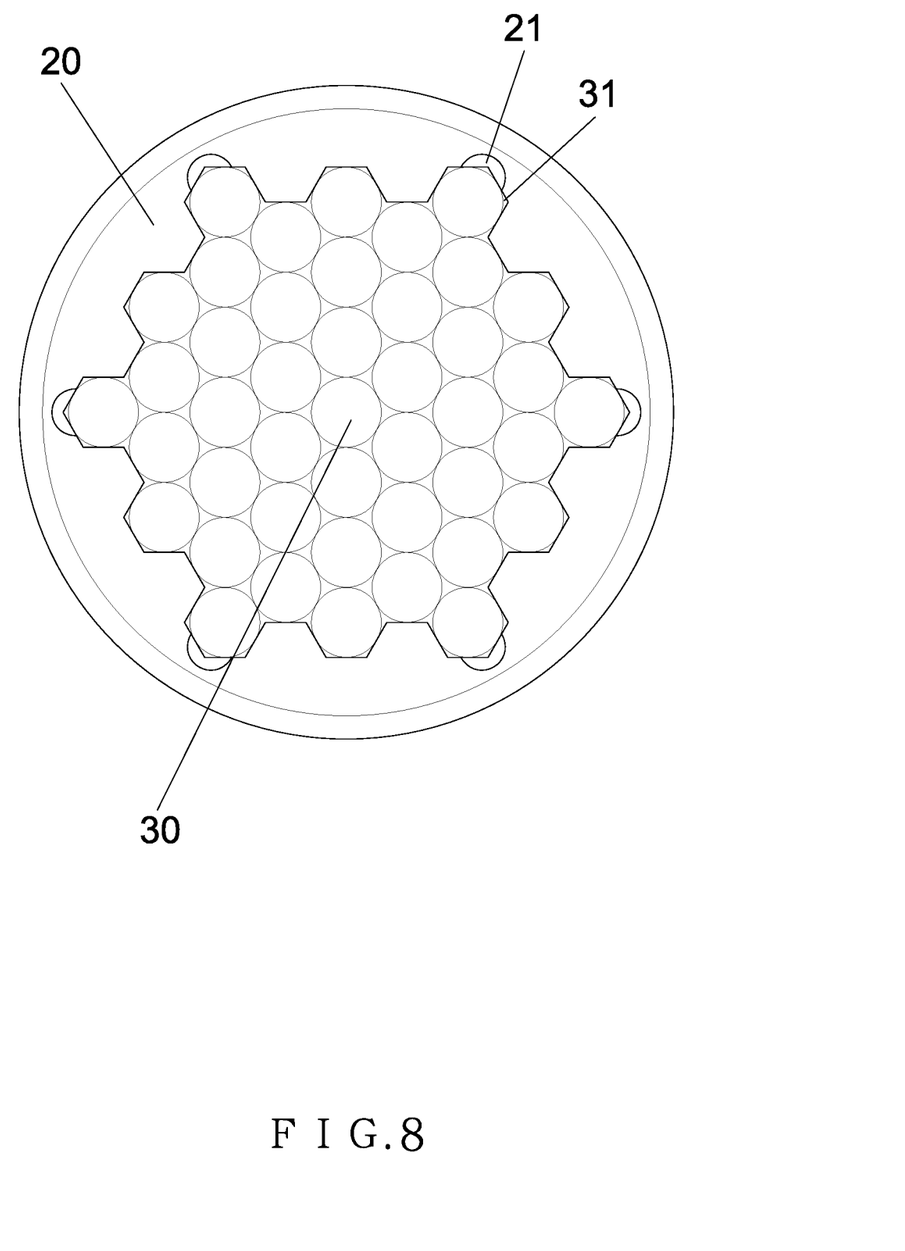
FIG. 8 is a side plan view showing the operation of the tool socket according to the preferred embodiment of the present invention.

With reference to FIGS. 5-7, a tool socket according to a preferred embodiment of the present invention comprises:

a body 20 including an accommodation groove 21 defined in a lower end of the body 20, a fitting orifice 22 formed in an upper end of the body 20 and communicating with the accommodation groove 21, wherein the accommodation groove 21 has a hexagonal wall arranged therein, and six toothed spaces 211 respectively extend outward from six corners of the hexagonally wall of the accommodation groove 21, any two inverted isosceles-trapezoid projections 212 extend outward from each of six sides of the hexagonally wall of the accommodation groove 21 and are separated by an isosceles trapezoid space 213 which extends outward from each side of the hexagonally wall of the accommodation groove 21, wherein a height of each of the six toothed spaces 211, said any two inverted isosceles-trapezoid projections 212, and the isosceles trapezoid space 213 is equal;

an elastic operation assembly 30 accommodated in the body 20, and the elastic operation assembly 30 including a locking seat 31 on which multiple apertures 311 are arranged in a honeycomb shape so as to accommodate multiple elastic hexagonal columns 32 individually, wherein the locking seat 31 is formed in a toothed hexagon shape has six toothed bulges 312 respectively extending outward from six corners thereof and corresponding to the six toothed spaces 211 of the accommodation groove 21 of the body 20, any two inverted isosceles-trapezoid recesses 313 defined on each of six sides of the locking seat 31 and are separated by an isosceles trapezoid projection 314 which extends outwardly from each side of the locking seat 31, wherein said any two inverted isosceles-trapezoid recesses 313 correspond to said any inverted isosceles-trapezoid projections 212 separately, and the isosceles trapezoid projection 314 corresponds to the isosceles trapezoid space 213, such that the locking seat 31 is accommodated in a housing room defined by the accommodation groove 21, the six toothed spaces 211, said any two inverted isosceles-trapezoid projections 212 of each side of the hexagonally wall of the accommodation groove 21, and the isosceles trapezoid space 213 between said any two inverted isosceles-trapezoid projections 212, as shown in FIGS. 6-8.

Thereby, the tool socket of the present invention has high torque and using durability as rotating a tool (such as fastener, not shown).

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. A tool socket comprising:
    a body including an accommodation groove defined in a lower end of the body, a fitting orifice formed in an upper end of the body and communicating with the accommodation groove;
    an elastic operation assembly accommodated in the body, and the elastic operation assembly including a locking seat on which multiple apertures are arranged in a honeycomb shape so as to accommodate multiple elastic hexagonal columns individually;
    wherein the accommodation groove has a hexagonal wall arranged therein, and six toothed spaces respectively extend outward from six corners of the hexagonally wall of the accommodation groove, two inverted isosceles-trapezoid projections extend inward from each of six sides of the hexagonal wall of the accommodation groove and are separated by an isosceles trapezoid space which extends outward from each side of the hexagonal wall of the accommodation groove;
    wherein the locking seat is formed in a toothed hexagon shape and has six toothed bulges respectively extending outward from six corners thereof and corresponding to the six toothed spaces of the accommodation groove of the body, two inverted isosceles-trapezoid recesses defined on each of six sides of the locking seat and are separated by an isosceles trapezoid projection which extends outwardly from each side of the locking seat;
    wherein said two inverted isosceles-trapezoid recesses correspond to said two inverted isosceles-trapezoid projections separately, and the isosceles trapezoid projection corresponds to the isosceles trapezoid space.

2. The tool socket as claimed in claim 1, wherein a height of each of the six toothed spaces, said two inverted isosceles-trapezoid projections, and the isosceles trapezoid space is equal.

3. The tool socket as claimed in claim 1, wherein a height of each of the six toothed bulges, said two inverted isosceles-trapezoid recesses, and the isosceles trapezoid projection is equal.

* * * * *